United States Patent [19]

Garner et al.

[11] Patent Number: 4,503,744

[45] Date of Patent: Mar. 12, 1985

[54] CLEAVING DEVICE FOR OPTICAL FIBERS

[75] Inventors: Peter Garner, Flemington; Nicholas T. Stancati, Mountainside; Tadeusz Szostak, Jackson, all of N.J.

[73] Assignee: Thomas & Betts Corporation, Raritan, N.J.

[21] Appl. No.: 394,526

[22] Filed: Jul. 2, 1982

Related U.S. Application Data

[63] Continuation-in-part of Ser. No. 360,206, Mar. 22, 1982, abandoned.

[51] Int. Cl.³ .............................................. C03B 37/16
[52] U.S. Cl. ........................................ 83/879; 83/589; 83/881; 225/2; 225/96
[58] Field of Search .................... 225/2, 96.5, 96, 101; 83/881, 589, 879

[56] References Cited

U.S. PATENT DOCUMENTS

| | | | |
|---|---|---|---|
| 4,168,026 | 9/1979 | Lukas et al. | 225/96.5 |
| 4,202,475 | 5/1980 | Hirai et al. | 225/96.5 X |
| 4,229,876 | 10/1980 | Doty | 225/96.5 X |
| 4,315,584 | 2/1982 | Wuestner | 225/96.5 X |

OTHER PUBLICATIONS

"Optical Fiber End Preparation for Low-Loss Splices"-by D. Gloge, P. W. Smith, D. L. Bisbee & E. L. Chinnock-Bell System Tech. Journal, 11/73.
"Optical Fiber Cutting Tool & Automatic Splicing Machine"-by Y. Toda, K. Sakamoto, K. Matsuno-Sumitomo Electric Tech. Review-1/80. Photographs-2.

*Primary Examiner*—Frank T. Yost
*Attorney, Agent, or Firm*—Robert M. Rodrick; Salvatore J. Abbruzzese

[57] ABSTRACT

An optical fiber cleaving device having a movable scoring element mounted between a movable arm and a fiber support member. The scoring element is responsive to the movement of the movable arm to move relative to both the movable arm and the fiber support member. This relative movement permits regulation of the force at which the scoring element scores the fiber supported on the support member. Such regulation provides for a more precise depth of score reducing adverse effects thereof.

13 Claims, 7 Drawing Figures

4,503,744

CLEAVING DEVICE FOR OPTICAL FIBERS

This application is a continuation-in-part of application Ser. No. 06/360,206, filed Mar. 22, 1982, now abandoned.

FIELD OF THE INVENTION

This invention relates to a device for cleaving optical fibers and more particularly pertains to a device for precisely regulating the depth of cut in a cleaving tool.

BACKGROUND OF THE INVENTION

In interfacing optical fibers with one another in splices and connections, it is essential to provide that each of the optical fibers to be coupled, have end surfaces perpendicular to longitudinal axis of the fiber with little or no variation. Further, it is also necessary to provide an end face which is nearly mirror smooth.

In order to obtain this smooth, perpendicular end face, the art has developed various methods of cutting the fiber. One such method involves grinding or polishing the end surface to provide the desired facing, or alternatively to apply chemical solvents to smooth over rough areas. Polishing or chemical reducing is not desirable as it is timeconsuming and costly and as such, cannot be used for field installation. Another such method is to cleave the optical fiber so as to provide this smooth, perpendicular face.

Optical cleaving tools of the type shown and described in U.S. Pat. No. 4,315,368, issued Feb. 16, 1982, and U.S. Pat. No. 4,372,048 issued Feb. 8, 1983, both assigned to the assignee of the present invention, provide for fiber end faces by cleaving the fiber along a longitudinal segment. A fiber scoring blade is brought in contact with a supported extent of optical fiber and scores or nicks the surface of the fiber. About this scored point, the fiber can be separated as by application of tension to ideally leave a smooth, perpendicular end face. One such application of this principal is shown and described in U.S. Pat. No. 4,202,475, issued May 13, 1980 to Harai et al, wherein the fiber is moved toward a scoring blade, then is flexed or bent at the point of the score to effect a sever.

In practice, however, due to the stresses placed upon the fiber by the cleaving blade, the severed end face often has rough, uneven portions which may tend to diminish optical transmission capabilities. Not only does the radial compressive stress transmitted by the cleaving blade cause this imperfection, but also the insertion of the blade itself may inhibit a smooth finish. Overinsertion of the blade may cause a shattering of the fiber end, while underinsertion will not provide enough of a nick to permit a clean sever.

It is desirable to provide an optical fiber cleaving device which can score the fiber so that upon severing, a smooth, perpendicular end face will remain.

SUMMARY OF THE INVENTION

It is an object of the present invention to provide an improved optical cleaving device.

It is a more particular object of the invention to provide a cleaving tool for minimizing the undesired effects of the cleaving blade.

In the efficient attainment of the foregoing and other objects, the invention looks toward providing a housing which supports therein an optical fiber on a support member. A scoring element is manually supported in the housing between an upper movable member and the support member. The movable member is moved to bring the scoring element in contact with the fiber. The scoring element is movable with respect to both the movable member and the support member so as to regulate the amount of force at which the scoring element strikes the fiber. By regulating the force the adverse effects of a too deep or too shallow cleave are eliminated. The scored fiber is then pulled apart along its longitudinal axis to leave a smooth end surface perpendicular to the longitudinal axis of the fiber.

In a preferred embodiment, the optical fiber is supported on a resilient surface to minimize the stress of the contacting scoring blade. The force at which the blade strikes the fiber is regulated by a flex bar, deflecting to act as a cantilever spring, the deflection of the spring being limited to a predetermined extent. Upon scoring, a puller element exerts an axial force to pull the fiber apart.

Other objects and features of the invention will be evident from the following detailed description of the preferred embodiments.

DETAILED DESCRIPTION OF PREFERRED EMBODIMENTS

Figures 1, 2:
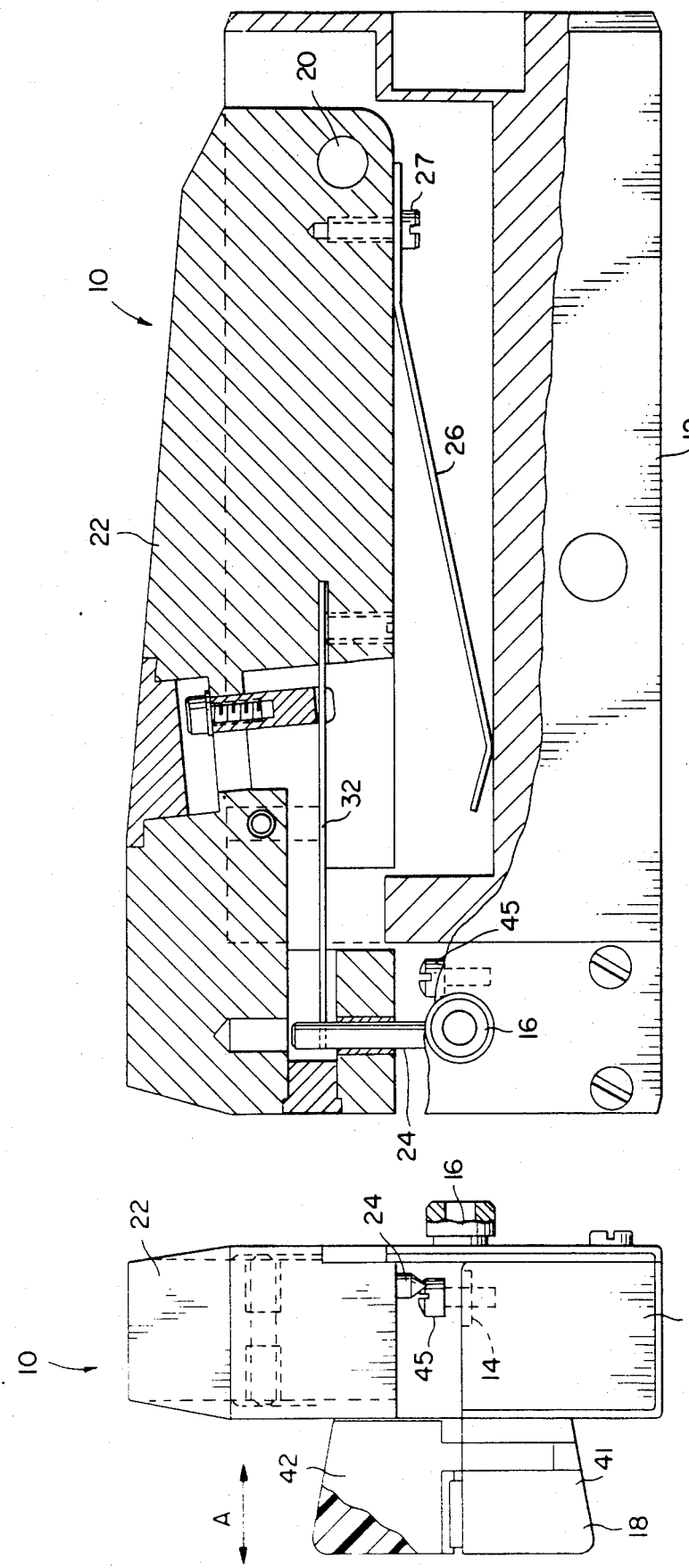
FIGS. 1 and 2 respectively, are side and front views partly in section of the fiber cleaving tool of the present invention.

The optical fiber cleaving tool 10 of the present invention, shown in one embodiment in FIGS. 1 and 2 includes an elongate base portion 12 supporting at one end a fiber support block 14 for receiving a longitudinal section of a bared optical fiber (not shown), a connector receiving member 16 and a fiber pulling member 18. The present embodiment is shown for cleaving optical fiber mounted in an optical fiber connector. The area of the fiber which is to be scored is situated between the connector receiving member 16 and fiber pulling member 18, so that once the fiber is scored, it can be longitudinally stressed and thereby severed, leaving a clean, smoothly cleaved end face, as will be described hereinafter. Notwithstanding, the preferred use of the connector receiving member 16, the present invention contemplates the cleaving of optical fiber whether or not supported in an optical fiber connector. It is apparent that any suitable holding device may be employed to secure the fiber over the support block 14.

Pivotally mounted about pivot 20, at the other end of base portion 12, is a pivotal arm 22, which extends over support block 14. Pivotal arm 22 movably secures a fiber scoring element 24 in a position directly over support block 14. The pivotal securement (which may be provided by a pin or similar arrangement) of arm 22 to base portion 12, allows movement of the fiber scoring element 24 relative to support block 14. A leaf spring 26 suitably secured by a fastener 27 to the underside of arm 22, resiliently contacts the upper surface of base portion 12 to therein provide a spring bias so as to maintain arm 22 in a normally non-engaged position over support block 14, when no downward force is applied. The arm 22 is movable against the bias of leaf spring 26 from the non-engaged position to a position where the scoring element 24 will contact the fiber support block 14.

Figure 3:
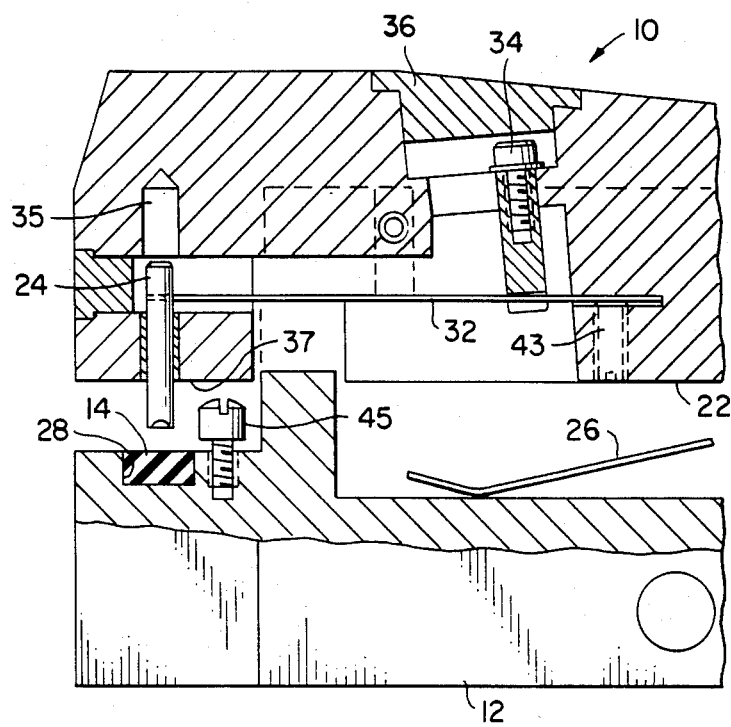
FIG. 3 is detailed showing of the cleaving area of the tool of FIGS. 1 and 2.

Referring now to FIG. 3, there is shown a fragmented, partially sectioned view of the fiber cleaving portion of tool 10. For simplification of description, the cleaving elements are shown without the fiber puller 18 or connector retainer 16, each of which will be described in detail hereinafter.

Base member 12 includes, adjacent its side marginal edge, a central recess 28 which supports therein, fiber support block 14. Shown in detail in FIG. 4, support block 14 is formed of a resilient material such as rubber, which resiliently supports an optical fiber 30 extending thereover. As the cleaving element 24 is constructed to bear down on the surface of fiber 30 to nick or score the fiber transversely to its longitudinal extent, stress is created at this point of contact. This stress is used to form the line of the cleave about which the fiber 30 severed under tension. However, at the point at which fiber 30 is supported, a second area of stress is formed. Such secondary stress, caused by the resultant oppositely directed force of the cleaving element, could form a second cleaving line which would result in an uneven non-uniform cleave. Resilient support block 14 is provided to reduce this second point of stress so that upon scoring only one cleaving line is created, thereby assuring a uniform cleave.

Figure 4:
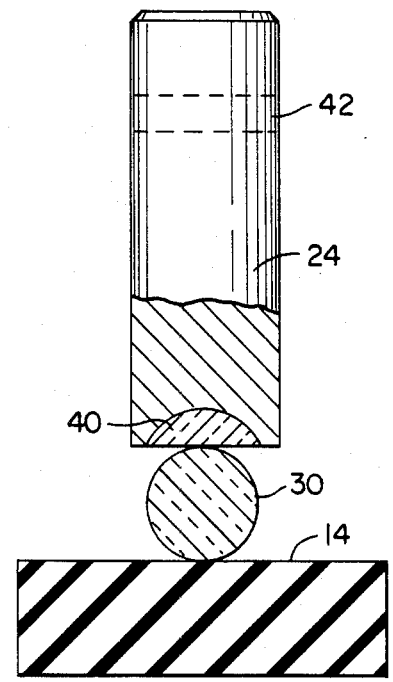
FIG. 4 shows partly in section, the cleaving tool in contact with the optical fiber, over the support pad.

The fiber support block 14 is shown in FIG. 4 as a flat, rectangular pad. It is within the contemplation of the present invention to include a longitudinal channel in support block 14 in which fiber 30 rests. Such a longitudinal channel would serve to guide the fiber 30 over the block 14, assuring proper positioning for ultimate cleaving.

Scoring element 24 is a cylindrical member, having a wedge-shaped cutting blade 40, typically formed of diamond or other suitably hard material. Blade 40 is shown as a cut diamond of about one-quarter carat. It should be understood that other suitable cutting blades and shapes may be used. Cylindrical scoring element 24 is arranged so that the wedge-shaped blade 40 is positioned transversely across the longitudinal extent of the positioned fiber 30. In this manner the blade 40 can score the fiber 30 to provide a flat face perpendicular to the longitudinal axis of the fiber. The upper end of cylindrical scoring member 24 includes a transverse bore 42 which extends entirely therethrough. Bore 42 accepts one end of a flex bar 32. As shown in FIG. 3, flex bar 32 is an elongate cylincrical rod suitably secured at one end to the central bore 42 of cylindrical scoring element 24 and at the other end is secured to arm 22 by an adjustment screw 43. Flex bar 32, which serves as a cantilevered spring member to resiliently support cylincrical scoring element 24 over fiber 30, is formed of relatively rigid material such as berrylium copper or other suitable metal which has a certain degree of elastic deformation about a secured point when a force is applied at one end. Once the force is removed, the bar 32 will return to its original form. In the present embodiment, the bar 32 is adjustably secured to and deflects about a securement point at adjustment screw 34. An opening 36 in the upper surface of arm 22 permits access to adjustment screw 34 which can be moved along the longitudinal extent of flex bar 32 so as to change the point at which flex bar 32 is supported. In response to the downward movement of arm 22, flex bar 32 will deflect upwardly upon the contact of scoring element 24 against the surface of fiber 30, as will be described hereinafter. As the force needed to deflect flex bar 32 is inversely proportional to the length of the bar measured from the point of support to the point of fiber contact, the amount of deflection and thereby the fiber scoring force can be controlled by the adjustment of screw 34. Chamber 35 is provided in the lower surface 37 of arm 22, above scoring element 24, so as to accept the upwardly moving scoring element 24 upon deflection of flex bar 32.

Referring again to FIGS. 1 and 2, as previously mentioned, tool 10 is intended to preferably cleave optical fiber in an optical fiber connector. A standard fiber connector such as shown and described for example in U.S. Pat. No. 4,378,145 issued Mar. 29, 1983 and commonly assigned herewith is mounted on the end of an optical cable so as to have a portion of bare or buffered fiber extending therefrom. The connector is then attached to connector receiving member 16, which in the present embodiment, is screw-cooperative with the connector. The extending portion of fiber 30 is supported along fiber support block 14 and further extends into fiber puller 18 where it is secured therein. Fiber puller 18 includes a base 41 for supporting the fiber from below and a clamping top 42 for securing fiber 30 from above. Clamping top 42 is spring loaded onto base 41 so as to bear down upon supported fiber 30 to hold it in a non-movable position. The entire puller assembly 18 is also spring loaded onto the end of the tool 10, so as to be retractably movable in the directions indicated by arrow "A" in FIG. 1. The puller assembly pulls on the scored fiber along its axial extent to sever it from the connector, at the point of the score.

The structure being substantially described, the operation of cleaving tool 10 can now be described with references to the drawings.

Figure 5:
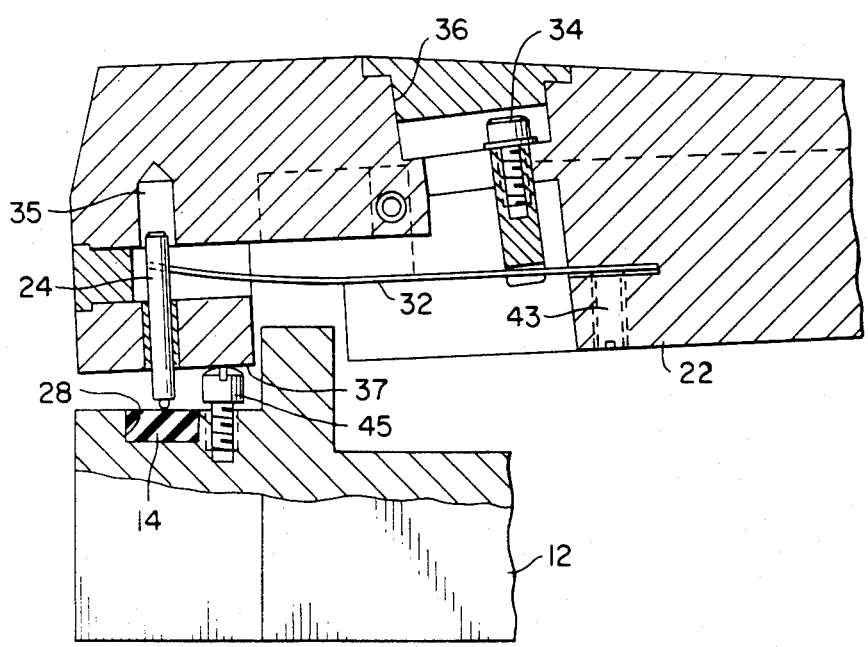
FIG. 5 shows the tool as shown in FIG. 3, in the operative position.

As aforementioned, with the optical fiber connector being attached to connector receiving member 16, optical fiber 30 will lie across fiber support block 14 and be secured in fiber puller 18. Referring to FIGS. 3, 4, and 5, pivotal arm 22 is moved downward under the influence of a manual force toward fiber support block 14 against the bias of leaf spring 26. Continued downward movement will bring scoring element 24 down upon fiber 30. As the cutting blade 40 contacts the surface of fiber 30, the resistance presented by fiber 30 against scoring element 24 causes the flex bar 32 to deflect upwardly, bringing the scoring element into chamber 35. As pivotal arm 22 is further depressed, the force required to deflect flex bar 32 will exceed the resistance presented by the fiber against blade 40, so that blade 40 will begin to penetrate fiber 30, scoring the same. Thus, scoring element 24 will move in relation to both the fiber support block 14 and the pivotal arm 22. This double relative movement allows precise control of the force at which fiber 30 is penetrated. As the blade 40 progressively scores the fiber 30 more deeply, the resistance of the fiber against the blade will increase due to the increase in the cross-sectional area of the cylindrical fiber 30. As the force desired to penetrate the fiber is proportional to the amount of deflection of the flex bar 35, by controlling such flex bar deflection the depth of fiber cutting is limited. In the present tool, an adjustable mechanical stop, as defined by a threaded bolt 45, is provided to limit the deflection of the flex bar 32 at a controlled amount. As such, the bolt 45 is mounted in base 12 and adjusted to a predetermined vertical level such that as the desired deflection of flex bar is reached, the lower surface 37 of the arm 22 strikes the bolt 45. Continued downward force on the arm 22 is thereby transferred to the mechanical stop without providing any further force to the fiber 30. It can thus be appreciated that the scoring force may be regulated by varying the vertical position of the mechanical stop 45 as well as by the movement of the adjustment screw 34. In this manner, the fiber 30 can be struck at a predetermined regulatable force, which will be less than the manual force applied to pivotal arm 22.

Once scored to a predetermined depth, the arm 22 is manually released so that under the bias of leaf spring 26, it will return to a nonengaged position, removing scoring element 24 from fiber 30. The score or nick in fiber 30 forms a stress line so that upon longitudinally pulling one end of the fiber by means of fiber puller 18, the fiber will sever, leaving a smooth end face which is perpendicular to the longitudinal axis of the fiber.

Having described one embodiment where the scoring element is connected directly to flex bar 32 which is adjustably mounted in pivotal arm 22, the present invention further contemplates, in a preferred embodiment, movably supporting the scoring element on the base 12 of the fiber cleaving tool.

Figure 6:
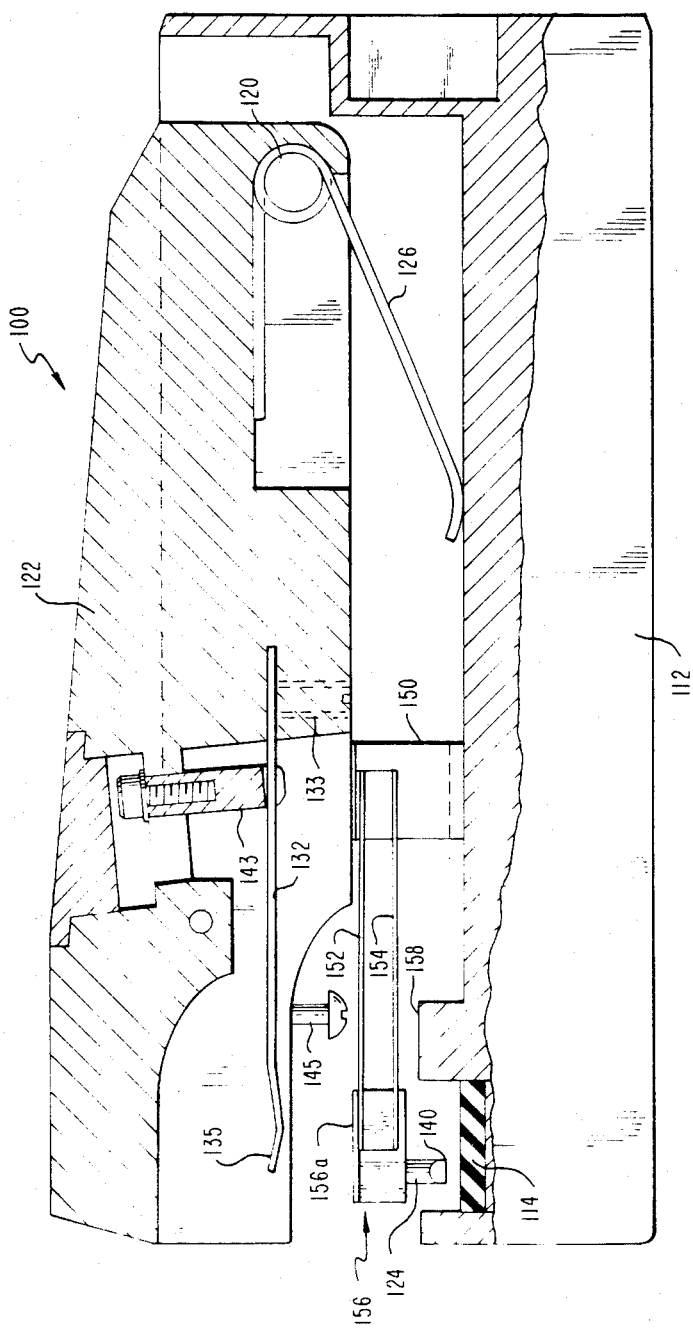
FIG. 6 is a side view partially in section of a further embodiment of the fiber cleaving tool of the present invention.
Figure 7:
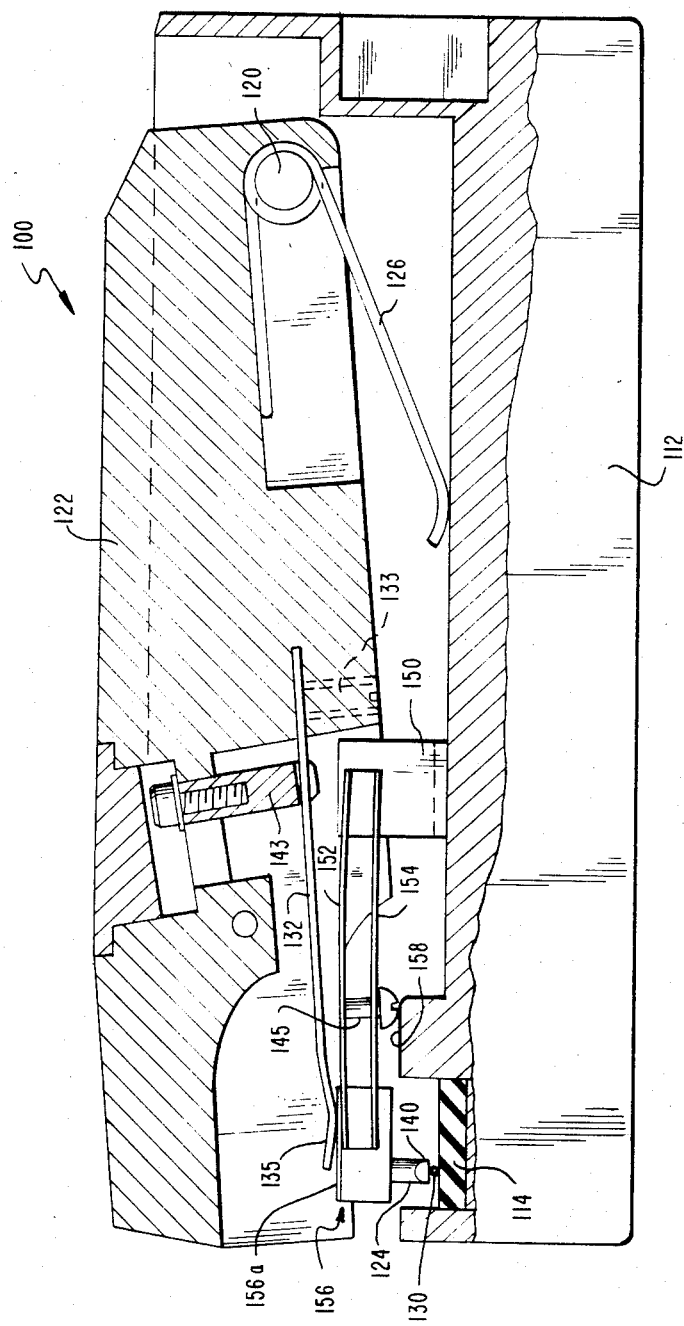
FIG. 7 shows the tool as shown in FIG. 6, in the operative position.

Referring now to FIGS. 6 and 7, there is shown fiber cleaving tool 100, which is substantially similar to tool 10 of FIGS. 1-5, with the principal modification being that fiber scoring element 124 is supported on base 112. For simplification of description, elements of the tool of FIGS. 6 and 7 will bear reference numerals increased by 100 in comparison with similar elements of the tool of FIGS. 1-5.

Cleaving tool 100 has an elongate base portion 112 which supports at one end a fiber support block 114 for receiving an extent of bared optical fiber (not shown). Pivotally mounted about pivot 120 at the opposite end of base 112 is pivotal arm 122 which extends over support block 114. As with the previously described embodiment, arm 122 is pivotally movable with respect to the base 112. A leaf spring 126 mounted between the arm 122 and base 112 about the pivot 120 provides a spring bias so as to maintain arm 122 in a normally nonengaged position. The arm 122 is movable toward base 112 against the spring bias during the cleaving operation, as will be described hereinafter.

In the present embodiment, elongate flex bar 132 is rigidly mounted at one end at a terminus 133 centrally located in pivotal arm 122. Flex bar 132 thereupon extends outwardly toward support block 114, where it has a free end 135 extending thereover. An adjustment screw 143 is centrally positioned over flex bar 132 and is movable along a longitudinal extent thereof. Adjustment screw 143 serves as a movable deflection point about which the resilient flex bar 132 can flex. As with the previously described embodiment, a force acting against the free end 135 of flex bar 132 will resiliently deflect it about the deflection point created by adjustment screw 143. Being resilient, once the force is removed, flex bar 132 will return to its prior position.

Referring again to base portion 112, the principal modification of the present embodiment can be understood. Base 112 includes at a central location, a fixedly secured mounting post 150 which extends toward arm 122. A pair of flat, elongate parallel spring beams 152 and 154, each having one end securely fixed in a cantilevered manner to mounting post 150, extend therefrom over support block 114. A scoring element holder 156 is supported by the outer ends of beams 152 and 154, so that the holder 156 is resiently suspended between the free end 135 of flex bar 132 and fiber support block 114. Holder 156 has a flat upper surface 156a for engagement with the free end 135 of flex bar 132 upon downward movement of pivotal arm 122, as will be described hereinafter. It is further contemplated that the upper surface 156a may include a longitudinal groove or channel for precisely receiving free end 135. Spring beams 152 and 154 will deflect in a nearly vertical direction about their securement points at mounting post 150 upon application of a downward force upon holder 156, and then will return to the prior position once the force is removed.

Holder 156 supports therein fiber scoring element 124 which depends therefrom, having its blade 140 positioned directly adjacent fiber support block 114. As previously described, the blade 140 is positioned directly over an extent of fiber supported by support block 114 for cleaving. A protruding member 158 adjacent support block 114 extends upwardly from base 112 to form a mechanical stop surface which limits the amount of movement of arm 122 with respect to base 112 and will be described in greater detail hereinafter.

The present embodiment being substantially described, the operation of the cleaving tool 100 can now be described with references to FIGS. 6 and 7 of the drawings.

With an extent of optical fiber lying across fiber support block 114, pivotal arm 122 is moved downward under the influence of a manual force toward support block 114, against the bias of leaf spring 126. Continued downward movement will bring free end 135 of the flex bar 132 down upon the flat surface 156a of holder 156, whereupon continued downward movement of arm 122 will bring scoring element 124 down upon fiber 130. Again, as with the previously described embodiment, as the cutting blade 140 contacts the surface of fiber 130, the resistance presented by fiber 130 against scoring element 124 causes the flex bar 132 to deflect upwardly, thereby preventing blade insertion into the fiber. As pivotal arm 122 is further depressed, the force required to deflect flex bar 132 will exceed the resistance presented by the fiber against blade 140, so that blade 140 will penetrate fiber 130, scoring the same. Thus, scoring element 124 will move in relation to both the fiber support block 114 against the bias of beams 152 and 154, and the pivotal arm 122 against the bias of flex bar 132. Again, this double relative movement allows precise control of the force at which fiber 130 is penetrated. As the blade 140 progressively scores the fiber 130 more deeply, the resistance of the fiber against the blade will increase due to the increase in the cross-sectional area of the cylindrical fiber 130. As the force desired to penetrate the fiber is proportional to the amount of deflection of the flex bar 135, by controlling such flex bar deflection the depth of fiber cutting is limited. In the present tool, an adjustable mechanical stop, as defined by a threaded bolt 145 and stop surface 158 limits the amount of deflection of flex bar 132 to a controlled amount. It can be appreciated that by adjusting the deflection point of flex bar 132 and the position of the mechanical stop, the scoring force may be regulated to provide a precise depth of cleave.

The mounting of the scoring element by the dual flat beams 152 and 154 secured to the base 112 minimize movement of the scoring element 124 in a direction perpendicular to the normal scoring movement.

With respect to both embodiments, the condition of the end face of cleave is determined by the depth of the score, the surface on which the fiber is scored, and the direction of pulling. As described herein, a resilient surface and longitudinal pulling are preferred so as to achieve an optimum cleave. Depth of the cleave, also a critical factor, is determined by the size and density of the fiber, together with the force used to strike the fiber. Knowing the size and density of the fiber, the force can be controlled within acceptable limits by the adjustment of the length of flex bar and the amount of deflection of such bar provided by the mechanical stop. The longer the effective length (measured from adjustment screw to scoring element, the lesser the force applied to the fiber at a given deflection and accordingly the shallower the depth of the score. A decrease in the effective length of the flex bar will result in a greater force for the same amount of bar deflection as allowed by the mechanical stop bolt and thus a deeper fiber score.

The present invention also contemplates a modified support block which includes a longitudinal channel in the support pad 14 as discussed hereinabove with reference to the first described embodiment. This channel may be V-shaped so that the side walls extend above the fiber supported therein. Upon movement of scoring element 24, blade 40 will contact the upper portion of the channel, further reducing the force at which scoring element 24 strikes fiber 30. By selecting a resilient pad having a certain degree of compressability, the depth of score may be further regulated.

Various other changes to the foregoing, specifically disclosed embodiments and practices will be evident to those skilled in the art. Accordingly, the foregoing preferred embodiments are intended in an illustrative and not in a limiting sense. The true spirit and scope of the invention are set forth in the following claims.

What is claimed is:

1. An optical element cleaving apparatus comprising:
  a housing;
  an optical element support member on said housing;
  a movable member in said housing for movement relative to said optical element support member under the influence of a first force;
  a scoring element supported in said housing for movement relative to said movable member, said scoring element being disposed adjacent said optical element support; and
  a cantilevered spring member movably attached to said movable member and directly supporting thereon said scoring element, said mounting member being cooperating with said scoring element for movement relative to said movable member for applying a predetermined regulatable force by said scoring element to an optical fiber on said support member different from said first force, said cantilevered spring member being deflectable and further including adjustment means coupled thereto for varying said predetermined regulatable force by regulating the amount of deflection of said cantilevered spring member.

2. The apparatus in accordance with claim 1 wherein said regulating member is movable along the extent of said cantilevered spring.

3. The apparatus in accordance with claim 1 further including a mechanical stop for limiting movement of said spring biased scoring element.

4. The apparatus in accordance with claim 1 wherein said support member includes a resilient support pad for supporting said optical element.

5. The apparatus in accordance with claim 1 wherein said scoring member is supported resiliently on said movable member.

6. An apparatus for cleaving optical fiber comprising:
  a support member for supporting said optical fiber;
  a movable member supported by said support member for movement relative thereto under the influence of a first force;
  a scoring element movably supported by said support member, said scoring element being disposed between said support member and said movable member; and
  means cooperative with said scoring element for applying a predetermined regulatable force by said scoring element to said optical element on said support member different from said first force;
  said force applying means including:
  a resilient securement member for resiliently supporting said scoring element to said support member; and
  a resilient contacting member supported in said movable member for engagement with said scoring element upon movement of said movable member.

7. The apparatus in accordance with claim 6 wherein said securement member and said contacting member are springs.

8. The apparatus in accordance with claim 6 wherein said resilient securement member includes at least one elongate flexible beam secured at one end to said support member and at the other end to said scoring element; and
  said resilient contacting member includes a deflectable cantilevered member for contacting said scoring element and flexing said beam upon movement of said movable member.

9. The apparatus in accordance with claim 8, wherein said resilient securement member includes a pair of such elongate flexible beams in substantially parallel disposition.

10. The apparatus in accordance with claim 8 including means for regulating the amount of deflection of said cantilevered member upon contacting said scoring element.

11. The apparatus in accordance with claim 10 wherein said regulating means includes an adjustable mounting member for adjustably securing one end of said cantilevered member to said movable member, said adjustable mounting member movable along the extent of said cantilevered member.

12. The apparatus in accordance with claim 11 wherein said force applying means further includes a mechanical stop for limiting movement of said scoring element.

13. The apparatus in accordance with claim 6 wherein said support member includes a resilient support pad for supporting said optical element.

* * * * *